United States Patent [19]

Debortoli et al.

[11] Patent Number: 5,167,001

[45] Date of Patent: Nov. 24, 1992

[54] OPTICAL FIBER STORAGE AND CONNECTOR TRAY AND SHELF AND TRAY ASSEMBLY

[75] Inventors: George Debortoli, Ottawa; Jaroslav M. Hvezda, Nepean; Jacques R. Desjardins, Laval, all of Canada

[73] Assignee: Northern Telecom Limited, Montreal, Canada

[21] Appl. No.: 753,587

[22] Filed: Sep. 3, 1991

[51] Int. Cl.⁵ .............................................. G02B 6/36
[52] U.S. Cl. .................................................. 385/135
[58] Field of Search ........................................ 385/135

[56] References Cited

U.S. PATENT DOCUMENTS

| | | | |
|---|---|---|---|
| 4,428,645 | 1/1984 | Korbelak et al. | 385/135 |
| 4,898,448 | 2/1990 | Cooper | 385/135 X |
| 5,067,784 | 11/1991 | Debortoli et al. | 385/135 X |
| 5,071,211 | 12/1991 | Debortoli et al. | 385/135 X |
| 5,071,220 | 12/1991 | Ruello et al. | 385/135 |

Primary Examiner—John D. Lee
Assistant Examiner—S. W. Barns
Attorney, Agent, or Firm—R. J. Austin

[57] ABSTRACT

An optical fiber tray including a fiber connector holder with storage in the holder for incoming fibers for connection to rear facing ends of the connectors. Front facing connector ends are joined to outgoing fibers in the form of patch cords which pass through a storage facility in which each patch cord is disposed in its own storage region. A minimum bend radius channel through which the patch cords travel is movable in the tray to lessen the distance moved by patch cords as the tray is moved forwardly and rearwardly. This movable channel allows for excess fiber from within the tray during tray movement and without disturbing patch cord material outside the tray.

15 Claims, 5 Drawing Sheets

OPTICAL FIBER STORAGE AND CONNECTOR TRAY AND SHELF AND TRAY ASSEMBLY

This invention relates to optical fiber storage and connector trays and shelf and tray assemblies.

Methods of storing optical fibers are known primarily through publications in patent specifications but also in a few commercially available designs. In U.S. Pat. No. 4,792,230 for example, the holder structure is described in which a storage space is provided for optical fibers entering the structure from an incoming cable and optical connectors are mounted on an arm located at one side of the holder. The optical fibers are connected each to one end of each connector. Other optical fibers exit from the other ends of the connectors and also pass through the storage space of the holder before proceeding as distribution fibers to telecommunications equipment in a customer's premises. A plurality of such holders are pivotally mounted in a housing so as to be movable into a withdrawn or use position within the housing or into an access position pivoted at the front of the housing for maintenance purposes. D In a further structure, such as described in German Offenlegungsschrift 2735106, a housing carries a tray which is pivotally mounted for movement into and out of the housing. Incoming optical fibers are stored within the tray and are connected to pigtail fibers also stored within the tray. The pigtail fibers extend from the tray to pigtail connectors mounted at the rear of the housing.

In both of the above-described constructions, optical fiber lengths must extend from the holder or tray to end user equipment in a customer's premises or to further connectors providing an interface with the user equipment. A problem which exists with existing or previously described equipment is that with the use of patch cords extending from connectors in holders or trays, the patch cords are normally made for convenience of the same length. Thus, where the patch cords need to extend for different distances between connectors, problems are found with the storage of excess lengths of patch cords.

In a recent U.S. patent application Ser. No. 423,281 (corresponding Patents Cooperation Treaty Patent Application No. PCT/CA 90/00271, i.e. International Publication No. WO91/05281) in the name of G. Debortoli, and entitled "Connector Holders and Distribution Frame and Connector Holder Assemblies for Optical Cable", connector holders are described which are extremely convenient in use both for obtaining access to the optical fiber connectors and also to the fibers themselves. As described in the latter specification, when these holders are mounted in receiving stations in a distribution frame, an increased density of connectors is provided per frontal unit area of frame. In the connector holders as described in this patent application, the connectors are mounted at a front end region of the holders so as to be located at the front of a distribution frame in use with one end each connector facing forwardly for ease of connection of additional fibers. In certain constructions, there are two vertical banks each housing a vertical tier of connectors and the additional fibers are provided by patch cords extending from selected connectors in one of the banks to selected connectors in the other bank. Because the distances between the connectors for the patch cords may vary from one bank to another, the patch cords are allowed to depend as free loops within a vertical channel between the two banks of holders. Thus, excess lengths of the patch cords are easily accommodated within the channel without obscuring the front of the two banks of holders so that access to any particular connector is easily accomplished. In addition, should any patch cord be required to be moved from one connector to another in either of the banks, then the loop of that particular patch cord is increased or decreased in length dependent upon the change in distance between the connectors.

The distribution frame and connector holder assembly described in the aforementioned patent application is completely suitable for large distribution frame assemblies, i.e. for use by a customer with a large quantity of end user equipment. However, while such an assembly may also be used by smaller customers, there is the problem that such a frame may inherently be too large for a small customer as a frame of such a design needs to be of a certain vertical height to accommodate the loop lengths of the patch cords.

The present invention provides an optical fiber tray structure and an assembly of a shelf housing such a structure and which is suitable for small customer use.

Accordingly, the present invention provides an optical fiber tray having a front end region and a rear end region and comprising:- a mounting region for optical connectors, the mounting region disposed at the front end region of the tray and comprising a plurality of connector mounting positions disposed in a series which extends from mounting position to mounting position laterally of the tray so that the connectors when mounted in the mounting positions each has an end facing forwardly and another end facing rearwardly of the connector; a first storage facility for optical fibers to be connected to rear facing ends of the connectors, the first storage facility disposed rearwardly of the mounting position; and a second storage facility with access to the second storage facility for other optical fibers to be connected to forward facing ends of the connectors, the second storage facility comprising a series of side-by-side dividers which are disposable into operating positions which separate the second storage facility into a series of storage regions between the dividers, the dividers being movable from the operating positions to provide access to any individual storage region.

The tray according to the invention is preferably provided with a minimum bend radius limiting means for directing the other optical fibers extending from the second storage facility and outwardly from the tray, the minimum bend radius limiting means being freely movable in a direction extending between the front and rear end regions of the tray. For this purpose, the minimum bend radius limiting means is advantageously mounted upon a rearwardly extending slide which is slidably mounted upon the tray. The minimum bend radius limiting means is slidable to enable relative movement between it and the remainder of the tray in a situation where the tray is mounted within a shelf and is movable within the shelf into and out of a storage position. During such movement into and out of the storage position, the lengths of the paths for the other optical fibers between the second storage facility and regions outside of the shelf automatically change and need to be accommodated by movement of the other optical fibers. However, with the use of the slidable minimum bend radius limiting means, the change in the lengths of the paths required to be followed by the other optical fibers is minimized with the fibers themselves assisting in positioning of the slide by applying a force to the minimum bend radius limiting means and causing its movement relative to the shelf while at the same time the fibers move within the tray to accommodate changing length. Hence, movement of the fibers outside the tray and the shelf is minimized and additional lengths, such as loops of superfluous optical fibers exteriorly of the shelf, are not required.

It is also preferable for the optical fiber tray to comprise an optical connector holder and an optical connector holder receptacle for mounting the holder in a holder receiving station in the receptacle. The holder is movable forwardly from the holder receiving station in the receptacle to a position in which a front end region of the holder extends beyond the receptacle to allow for access to front ends of the connectors when these are mounted in the mounting positions of the mounting region which is provided by the holder.

The invention also includes an optical fiber shelf and tray assembly comprising a shelf having a front and a rear and a plurality of optical fiber trays movable individually through the front of the shelf into and out of storage positions within the shelf in which positions the trays are disposed in parallel series relationship, and each optical fiber tray has a front end region and a rear end region and comprises:- a mounting region for optical connectors, the mounting region disposed at the front end region of the tray and comprising a plurality of connector mounting positions disposed in a series which extends from mounting position to mounting position laterally of the tray so that connectors when mounted in the mounting positions each has an end facing forwardly and another end facing rearwardly of the connector; a first storage facility for optical fibers to be connected to rear facing ends of the connectors, the first storage facility disposed rearwardly of the mounting region; and a second storage facility with access to the second storage facility for other optical fibers to be connected to forward facing ends of the connectors, the second storage facility comprising a series of side-by-side dividers which are disposable into operating positions to separate the second storage facility into a series of storage regions between the dividers, the dividers being movable to and from the operating positions to provide access to any individual storage region.

One embodiment of the invention will now be described, by way of example, with reference to the accompanying drawings, in which:

FIG. 2 is a view similar to. FIG. 1 and showing the trays in another position;

Figure 1:
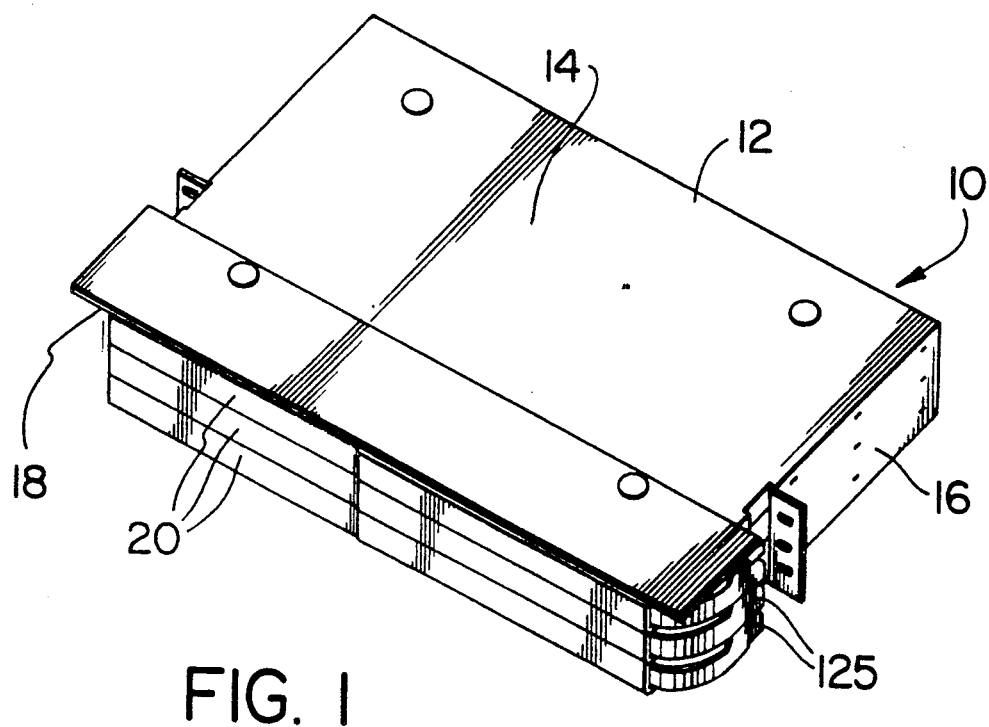
FIG. 1 is an isometric view of an assembly of optical fiber shelf and trays with the shelf in one position.
Figure 2:
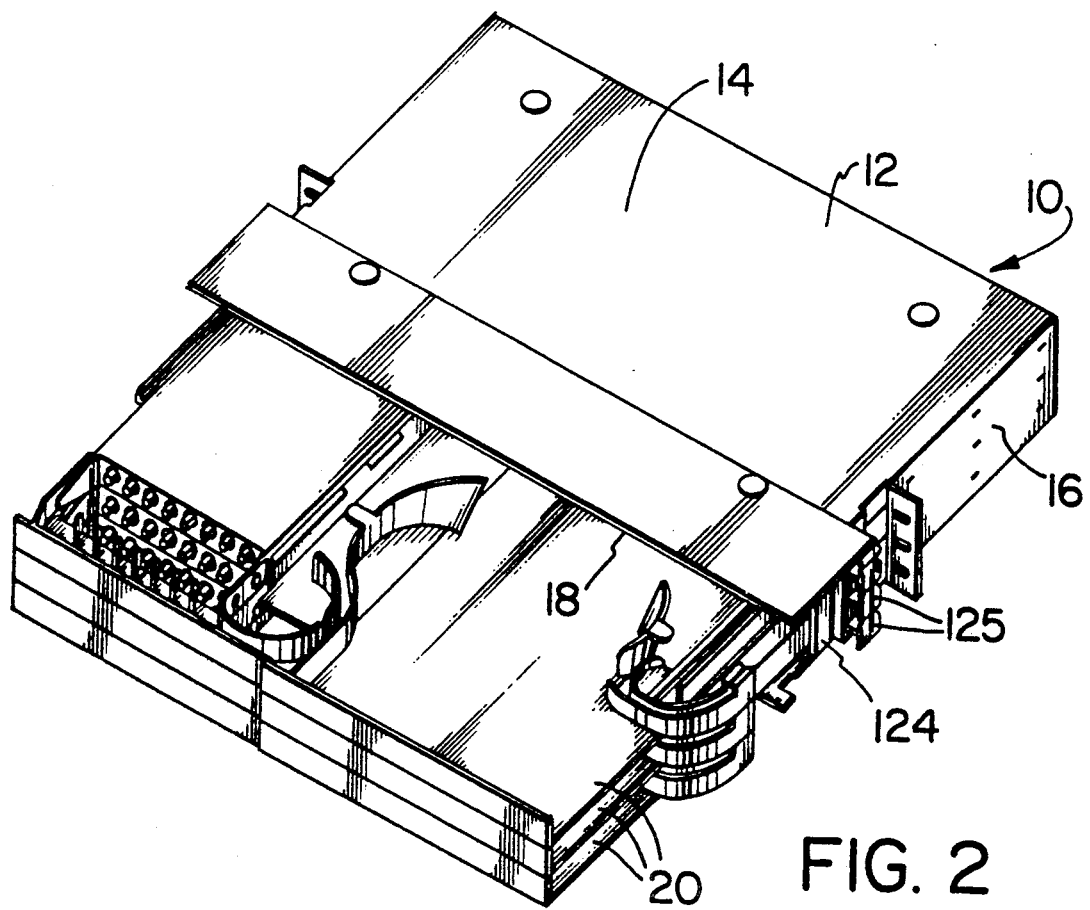

As shown by FIG. 1, an optical fiber shelf and tray assembly 10 comprises a shelf 12 having a top 14 and two sides 16 extending between the top and a base of the shelf (not shown) which lies parallel to the top 14 to form a box. A front 18 of the shelf is open, as shown particularly by FIG. 2, and a rear (not shown) of the shelf extending between the sides 16 and the top 14 and the base is completely closed. As shown by FIGS. 1 and 2, the shelf 12 houses three optical fiber storage trays 20. The trays are disposable in storage positions in the shelf 12 as shown by FIG. 1 and are movable individually by sliding movement from the front 18 of the shelf, into forward positions removed from the storage positions. FIG. 2 shows all of the trays in their forward positions. As may be seen, with an individual tray in its forward position of FIG. 2, with other trays retained within the shelf, then the features of the tray are exposed at its upper surface to enable optical fibers and connectors to be disposed in the tray in a manner to be described. As will be seen from FIG. 2 parts of the top tray have been omitted for clarity. These parts are shown in FIG. 3 which is now to be described.

Figure 3:
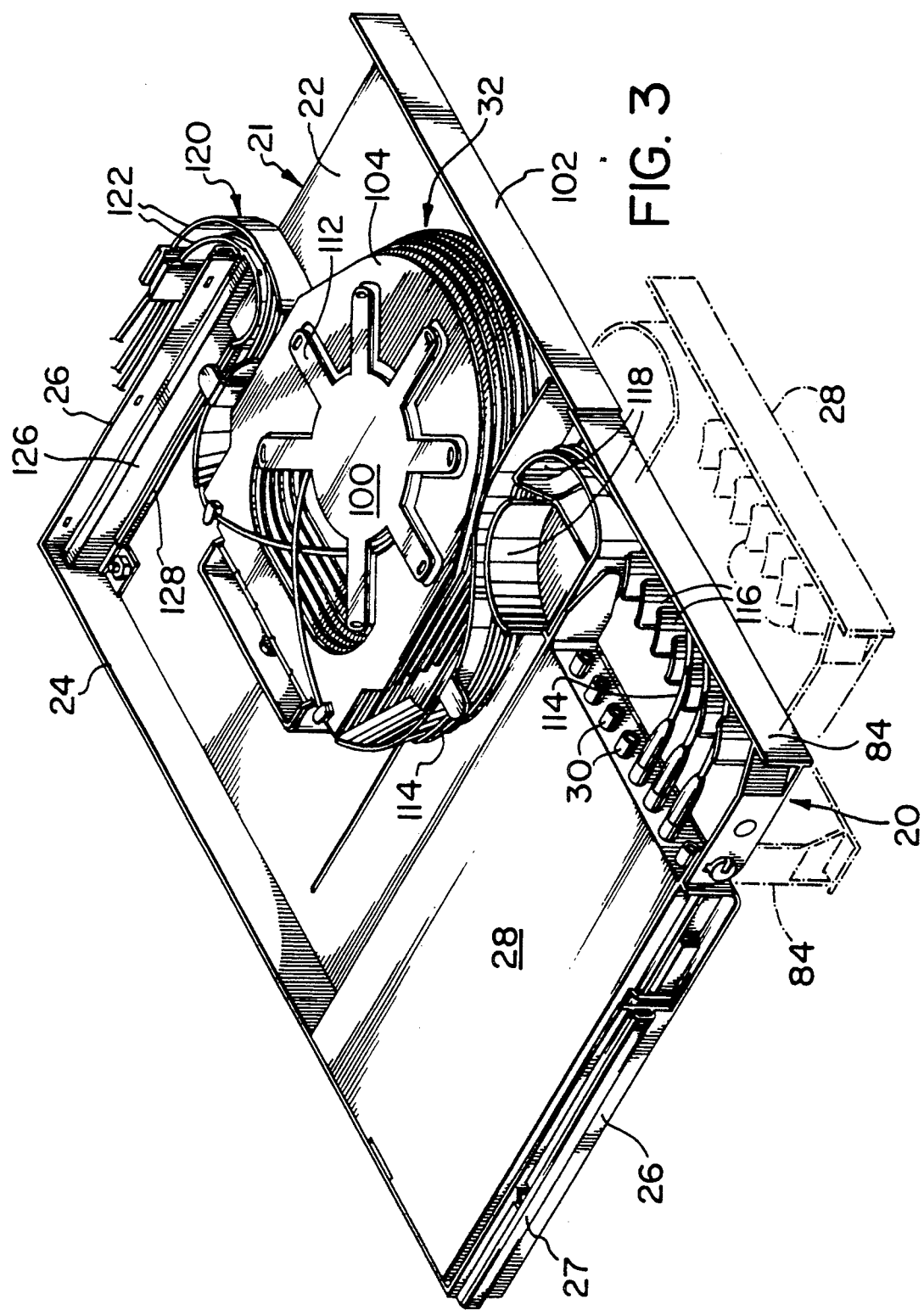
FIG. 3 is an isometric view from the opposite side from FIGS. 1 and 2 and to a larger scale, of an individual tray showing more detail, the tray being shown in the position of the trays in FIG. 2.

As shown by FIG. 3, each tray comprises an optical connector holder receptacle 21 having a base panel 22, a rear end region having an upwardly extending rear flange 24 and two side flanges 26 which extend forwardly towards the front end region of the tray. Each of the flanges 26 has a horizontal guide rail 27 extending outwardly from it to be received within a guide groove (not shown) in the shelf so as to enable the tray to be moved horizontally between its two positions in the shelf.

The receptacle 21 of each tray houses an optical connector holder 28 as shown by FIG. 3. This optical connector holder, as will be described, houses a storage facility for connecting incoming optical fibers to optical connectors 30 mounted along a mounting region of the holder and an additional storage facility 32 (as will be described) is provided upon the base 22 of the receptacle 21 for optical fibers extending from front ends of the connectors 30 into the storage facility 32 and then outwardly from the tray and thus from the shelf as will be seen.

Figure 5:
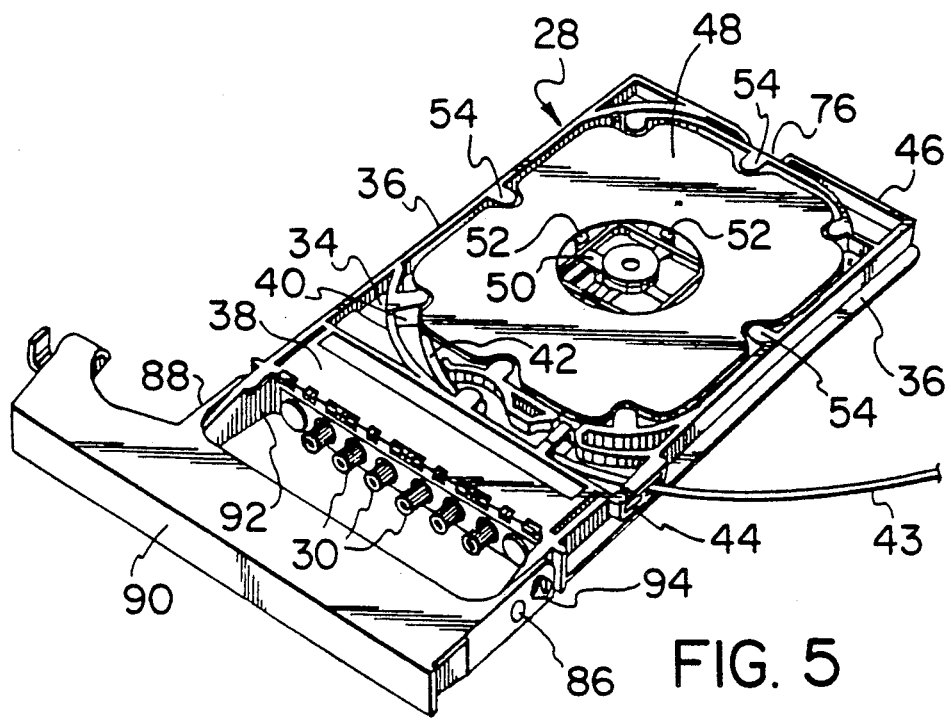
FIG. 5 is an isometric view onto the other side of the holder.
Figure 4:
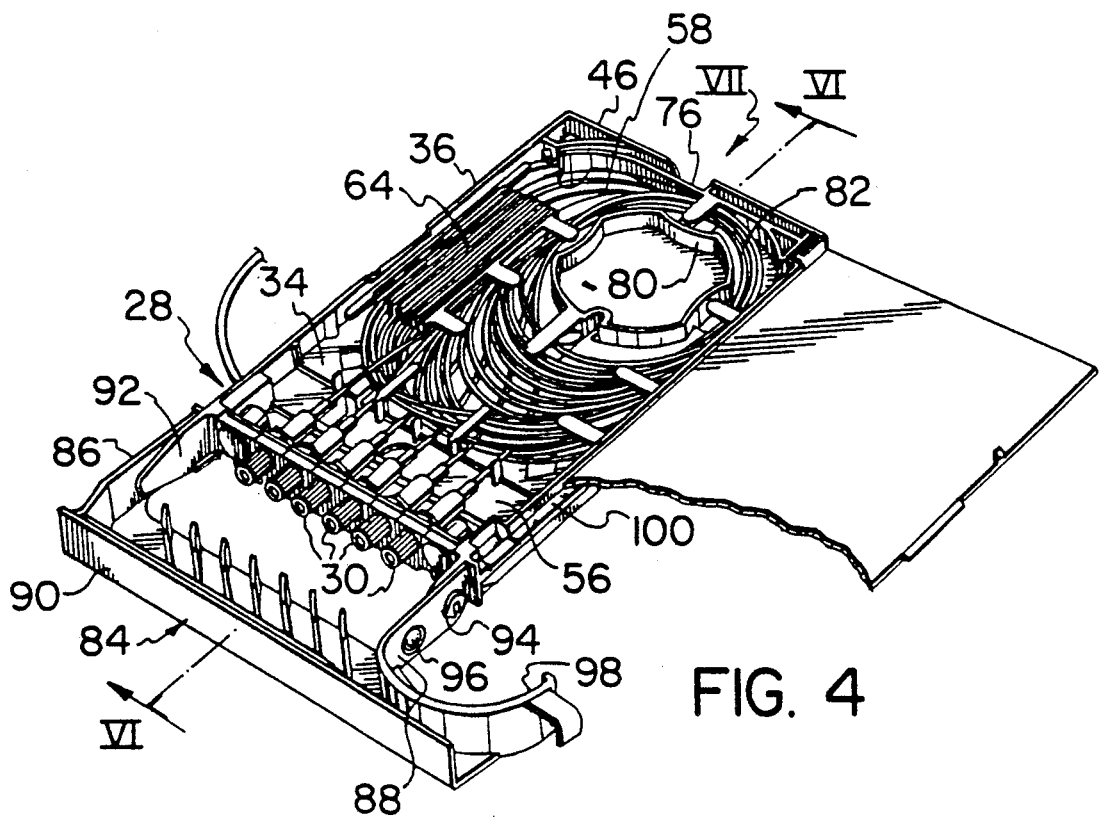
FIG. 4 is an isometric view of an optical connector holder forming part of the tray of FIG. 3, and showing optical fibers and connectors mounted within the holder.

The connector holder 28 is basically of the structure described in Patents Cooperation Treaty Patent Application No. PCT/CA90/00271 (International Publication No. W091/05281). The holder 28 is of planar configuration as shown in FIG. 4 and has a planar base 34 (FIGS. 4, 5 and 6) in the plane of the holder, the base 34 being bordered by side walls 36 which extend outwardly in both directions from the plane of the base. At the front end region of the holder is provided a mounting region 38 for optical connectors 30 which are positioned laterally spaced from one another across the width of the holder from one side wall 36 to the other. On one side of the base and between the side walls 26 there is disposed a storage compartment 40 (FIGS. 4 and 5) for incoming optical fibers stored within a tube 42 which passes through an inlet 44 and into the storage compartment 40. The storage compartment 40 extends between the mounting region 38 and a rear end wall 46 of the holder, the rear end wall extending between the side walls 36. The compartment 40 is provided with a cover 48 which covers substantially the whole of the compartment except surrounding edges. As described in the aforementioned application, the cover 48 is movable at right angles to its plane between an inner operative position as shown in FIG. 5 and a slightly retracted position (not shown) in which it stands upwardly from the walls 36 to enable the tube 42 to be passed laterally between the edges of the cover and the walls during assembly of the tube into the compartment. The cover 48 is mounted upon a central structure shown at 50 in FIG. 5 and is locatable in its operative and retracted positions by latches 52. Localized flanges 54 extend inwardly into recesses in the cover 48 so as to distort the gap around the cover and render it impossible for a tube to be removed with the cover in its operative position.

On the other side of the holder as shown in FIG. 4, a second compartment 56 is provided. This compartment also extends from the mounting region to the rear end 46 of the holder.

Figure 6:
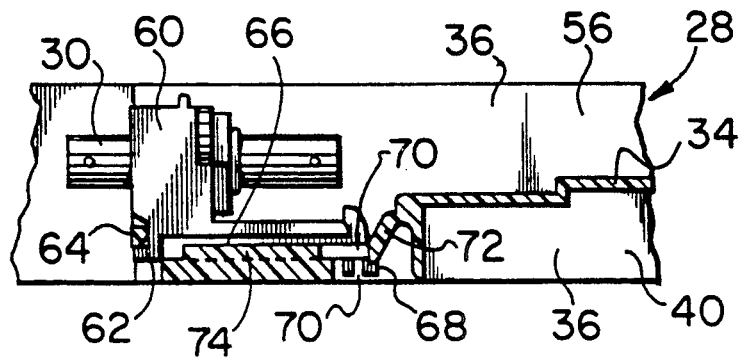
FIG. 6 is a cross-sectional view through the holder and to a larger scale, taken along line VI—VI in FIG. 4.

As shown by FIG. 6, the base 34 extends downwardly at the mounting region 38 so as to define sufficient room for location of the connectors 30 in their side-by-side positions. Each connector 30 is held by a connector mount 60 which is provided with a forwardly facing foot 62 (FIG. 6) which is disposed under an overhanging element 64 at a front side of a recess 66 provided along the mounting region. The other end of each connector mount 60 has a flexible latch 68 which is received through a hole 70 in the base of the recess, the latch then engaging beneath an inclined side 72 of the recess to hold the connector mounts in position. Within the recess are provided a plurality of ribs 74 which are laterally spaced apart across the width of the holder for location within corresponding recesses in the connector mounts to locate them accurately in position.

Figure 7:
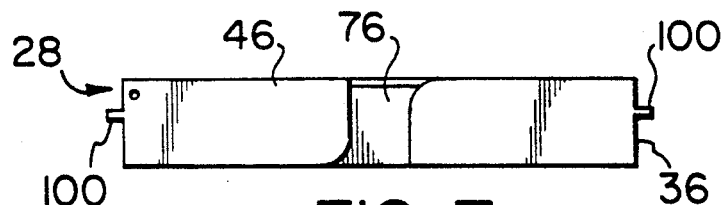
FIG. 7 is a rear end view of the holder taken in the direction of arrow VII in FIG. 4.

The two compartments of the holder are interconnected at the rear wall 46 by interconnecting passage 76 (see FIG. 7) to enable the tube 42 to pass from one compartment to the other.

Thus the tube 42 passes through the inlet 44 around the compartment 40 and then through the interconnecting passage 76 before extending into the other compartment. In the other compartment 56, optical fibers 58 extend from an end of the tube and around the compartment to terminate at a splice block 64 (FIG. 4). A substantially annular structure 80 is provided within the compartment 56 to limit the minimum bend radius of any fibers in that compartment to ensure that attenuation in the fibers is restricted. At the splice block 64 each of the fibers 78 is permanently connected to other fibers 82 which are provided by pigtails of which the optical connectors 30 form a part.

The holder 28 also comprises a connector guard 84 mounted at its front end. Generally the guard is as described in the aforementioned application in that it has two sides 86 and 88 and a front end 90 which extends across the width of the holder. The two sides 86 and 88 are hinged so as to be movable between an upper connector guarding position in the plane of the holder, as shown in full outline in all of the figures, and a downward position (as shown in FIG. 3 in chain-dotted outline).

The guard is pivoted in front of the mounting region 38 upon two forward extensions 92 of the side walls 36 at positions 94 and is normally retained in the guarding position by domed protrusions 96 on free ends of the extensions 92, the domed protrusions extending into holes in the side walls 86 and 88. To move the guard 84 in and out of the guarding position, a downward pressure on the front of the guard is sufficient so as to cause the walls to flex inwardly whereby the protrusions move into or out of the respective holes in the side walls 86 and 88. An arcuate extension 98 of the side walls 70 provides a means for limiting the minimum bend radius of fibers extending from a space between the optical connectors and the front 90 of the guard the extension 98 being spaced slightly rearwardly of the front to provide a space for positioning of the fibers.

The sides 36 of the holder are provided with horizontal guide flanges 100 (see FIGS. 4 and 5) and these flanges are received in channels (not shown) of the receptacle 21 to allow for forward and rearward movement of the holder within the receptacle into and out of the holder receiving station. With the holder in the receiving station as shown by FIG. 3, the guard 84 is in its upper guarding position and the front 90 is disposed behind a front flange 102 of the receptacle 21 which extends across the front of the receptacle in a position laterally of the holder 28 so as not to restrict its forward movement.

Figure 8:
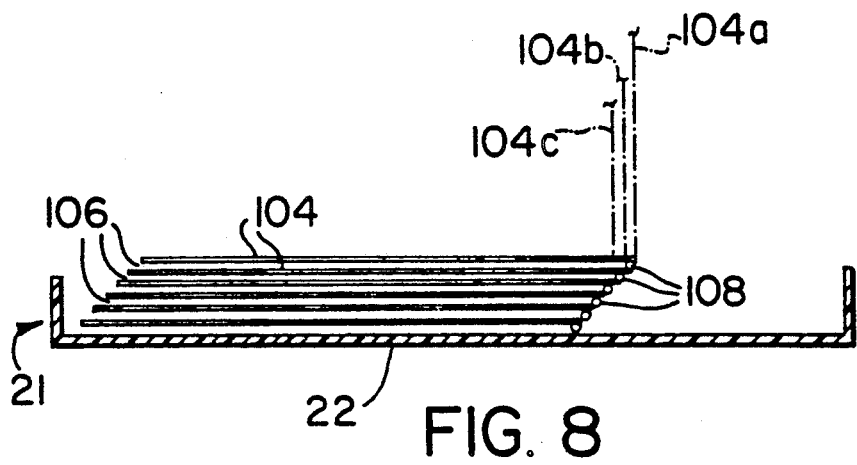
FIG. 8 is a diagrammatic cross-sectional view through the tray of FIG. 3 to show relative positions of dividers of a storage facility.

As shown by FIG. 3, in the second storage facility 32, there are provided a plurality of dividers 104 which are normally located in substantially parallel operating positions in which they divide the storage facility into a series of storage regions 106 (see FIG. 8) between the dividers. In the operating positions, the dividers lie substantially parallel with the base 22 of the receptacle 21. Each of the dividers is separately hinged to the tray to permit hinging of a required number of dividers to provide access to any of the storage regions 106. For this purpose, the dividers are permanently hinged to the receptacle about parallel axes 108 (FIG. 8) the parallel axes being relatively disposed along a line inclined to the parallel planes of the dividers to permit the dividers in turn to be pivoted out of the operating positions free from interference with any tray which has previously been moved from its operating position above it. For instance, as shown by FIG. 8 in which all of the dividers 104 are shown in full outline in their parallel horizontal operating positions, a top divider 104a is first moved into an upper position shown in chain-dotted outline to allow for access to the storage region 106 immediately beneath that divider. Should the subsequent and lower storage region 106 be needed to be reached then the second divider 104b is also pivoted into a chain-dotted position as shown by FIG. 8, the pivotal positions being so relatively disposed that the movement of the second divider 104b is not restricted by the position of the first divider 104a. As may be seen, should further storage regions require access then further dividers may be moved in turn into their upper positions as shown for instance by divider 104c to allow for complete access.

Each of the dividers 104 is produced by pressing a flat metal sheet so that a central substantially circular region 110 is pressed upwardly from the general plane of the divider together with a plurality of radially extending arms 112. In the operating positions, the dividers 104 are supported one upon another by parts of the arms 112 engaging beneath an upper divider. The arms 112 and the main body of each divider 104 provide a space into which patch cords 114 may pass, as will be described, for storage purposes.

Patch cords 114 to be stored by the storage facility 32 are each received at one end in the forward facing end of an individual connector 30. The patch cords 114 then proceed around curved blades 116 of the guard of the holder for limiting the minimum bend radius of the patch cords so that the optical fibers in the patch cords cannot be bent below a desired minimum bend radius. Further minimum bend radius limiting means shown generally at 118 is provided for guiding the patch cords 114 from the blades 116 to the storage facility 32. Upon reaching the storage facility 32 each individual patch cord is disposed within a storage region 106 of the facility. This is performed by having all of the dividers 104 in their upright positions shown for instance in the chain-dotted outline in FIG. 8 and then disposing the patch cords in turn into their individual storage spaces 106, the next divider 104 then being moved into its operating position immediately a patch cord has been disposed in the storage space 106 beneath it. As shown by FIG. 3, the patch cords 104 are passed around the central substantially circular region 110 of their respective dividers 104 and, dependent upon the lengths of the patch cords, may proceed around this central region and beneath the arms 112 for multiple turns of the patch cord. The patch cord then proceeds away from its storage region 106 and passes around a minimum bend radius limiting means 120 which is movable relative to the receptacle 21.

Figure 9:
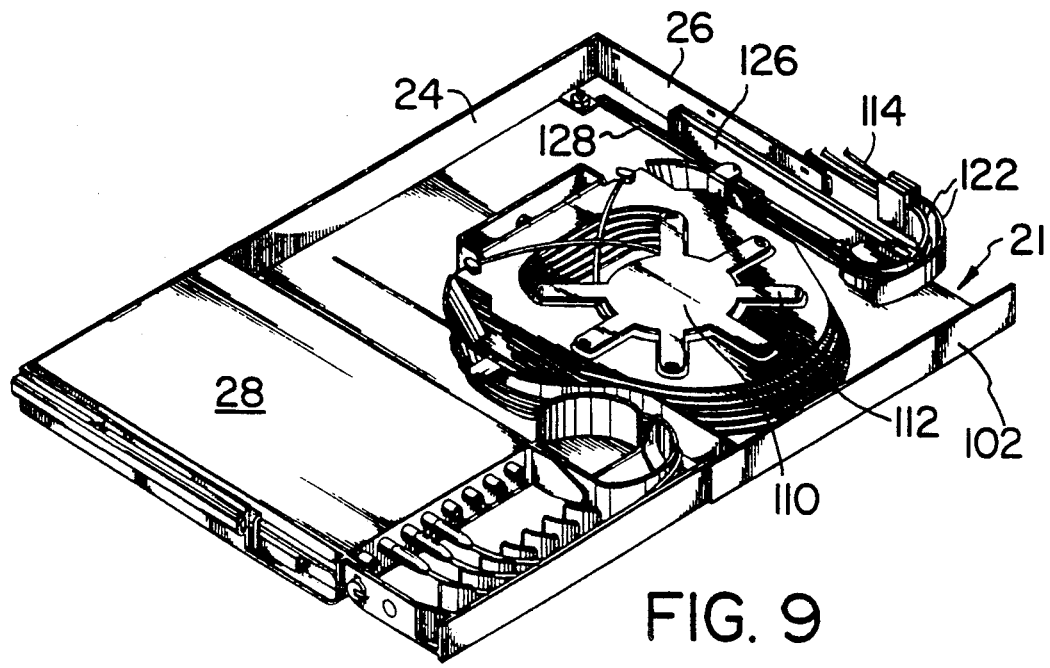
FIG. 9 is a view similar to FIG. 3 showing $ relative positions of parts of the tray during movement of the tray towards its position in FIG. 1.
Figure 10:
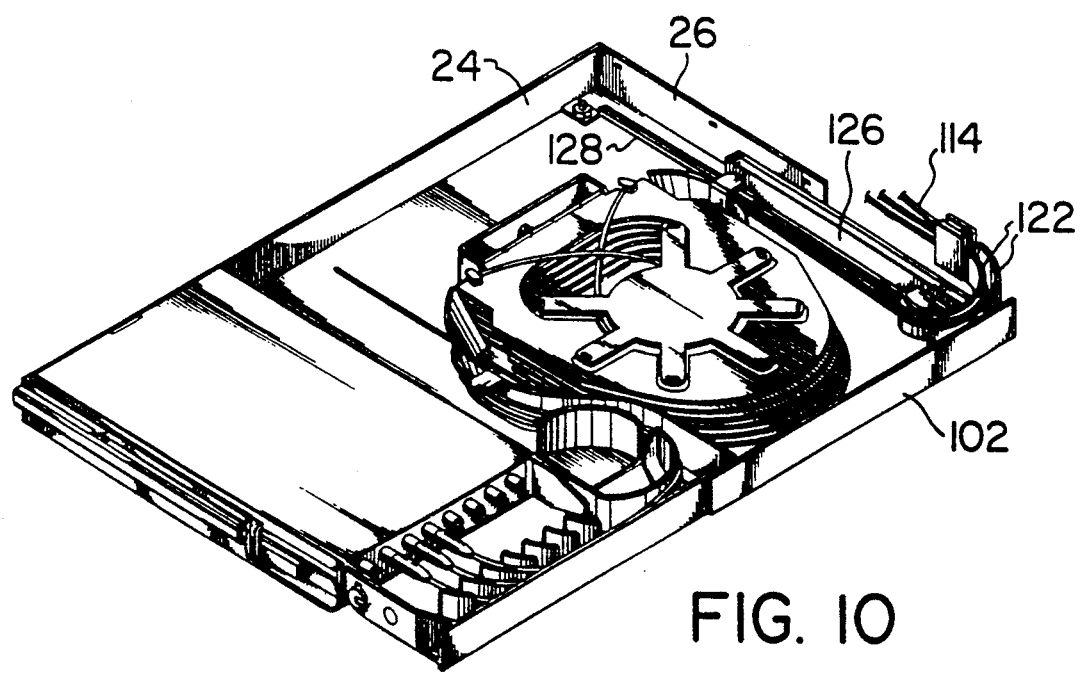
FIG. 10 is a view similar to FIG. 3 of a tray and showing the relative positions of its features upon reaching the tray position in FIG. 1.

As shown by FIGS. 3, 9 and 10, the minimum bend radius limiting means 120 comprises two arcuate plates 122 which are radially spaced apart to accommodate the patch cords 114 so as to control their position and minimum bend radius. The two plates extend outwardly beyond one edge of the base 22 and, with each of the trays in its storage position within the shelf, the arcuate plates 122 extend outwardly around a forward edge 124 of a side 16 of the shelf (FIGS. 1 and 2), this edge 124 being displaced rearwardly from the remainder of the front of the shelf so that with the tray in its storage position the front end 90 of the guard 84 and the flange 102 of the receptacle 21 lie substantially along the front of the shelf as shown in FIG. 1. The patch cords 114 extend from between the arcuate plates 122 and extend between guides 125 on the appropriate side 16 of the shelf. The guides 125 are shown in FIGS. 1 and 2 while the patch cords 114 are omitted from those Figures for clarity.

The minimum bend radius limiting means 120 is slidably movable relative to the receptacle 21 in a forwards and rearwards direction of the tray. For this purpose, the limiting means 120 is mounted at the front end of a rearwardly extending slide 126 which is slidably mounted beneath an overturned flange 128 secured in turn to the base 22 of the receptacle. Thus the slide 126 is movable rearwardly and forwardly of the tray while carrying the arcuate plates 122 with it.

With an optical connector holder equipped with stored fibers and connectors 30 and the holders mounted on respective receptacles 21, each tray in turn is disposed forwardly of its storage position within the shelf as shown by FIG. 2 for location of the patch cords 114 within the tray. The patch cords 114 are then positioned, as described with reference to FIG. 3 at which time the arcuate plates 122 lie rearwardly and spaced from the front flange 102 of the receptacle 21 while also being spaced forwardly from the front edge 124 of the respective side 16. At this position, the arcuate plates 122 are disposed for the shortest path for the patch cords 114 between the connectors 30 and the position at which they pass through the guides 126 on the side 16. The patch cords are then disposed in position, in sequence into their respective storage regions 106 before being passed outwardly of the storage facility 32 and between the arcuate plates 122. Sufficient slack is provided in the patch cords 114 as they proceed around their respective central circular regions 110 to allow for lengthening of the path for the patch cords either by movement of the arcuate plates 122 forwardly with respect to the flange 102 or by outward and forward movement of the holder 28 from the tray.

Upon commencement of movement of the tray into its storage position, the rear flange 24 of the tray, which has previously contacted the rear end of slide 26, moves rearwardly away from the slide 126 thereby permitting movement of the slide and the guide plates 122 in a rearward direction. Such a position is shown by FIG. 9 in which there is a large distance between the slide 126 and the rear flange 24. As movement proceeds into the storage position, pull is provided upon each of the patch cords 114 because of its lengthening path as the storage facility 32 moves rearwardly of the guide plates 122. The lengthening path is accommodated to a degree by movement of the patch cords out from the storage regions 106. However, the length of the path does not increase noticeably as the tray is moved into its storage position, because the tension on the patch cords also serves to apply pressure upon the arcuate plates 122 so as to cause them to move rearwardly independently of the tray. This movement is of course accommodated by sliding reception of the slide 126 beneath the flange 128. This type of action continues until the rear arcuate plate 122 engages the forwardly facing edge 124 of the side 16 and may be assisted by contact of the front arcuate plate 122 by the front flange 102 of the receptacle. This is the position of FIG. 10.

As may be seen from the above description the use of the bend radius limiting means having relative movement to the tray and also the excess storage of the patch cords in the storage regions 106 enable the tray to be moved into and out of its storage position without requiring any excess patch cord material from outside the shelf. Because of the relative movement of the arcuate plates 122 and the tray, the actual forward and rearward movement of the arcuate plates is substantially less than that of the tray itself. This situation can be seen primarily from a comparison of the positions of the arcuate plates 122 and the front flange 102 of the tray in FIGS. 1 and 2. Whereas each tray moves a substantial distance as shown by FIGS. 1 and 2, forward movement of the slide 126 and thus of the plates 122 is relatively slight during forward movement of the tray until the flange 24 at the rear of the tray moves into engagement with the slide 126 at which point the plates 122 move together with the tray. This situation is not reached until the tray has progressed along a substantial part of its movement.

Thus, as can be seen from the above description because of the freedom to move of the arcuate plates 122 and their partial positional control by the patch cords 114 themselves, the patch cord material moves along the path between the guide plates 122 from within the tray as the tray moves between its two positions thereby substantially negating any movement of patch cords as they extend outwardly from the shelf and along the respective side 16.

With the tray in its forward position of FIG. 2, the respective guard may be lowered into its chain-dotted position as shown in FIG. 3 to enable any particular patch cord 114 to be removed from its respective connector 30 or for patch cords to be interchanged upon their connectors 30. In addition, with the tray in its forward position, the guard, which normally is disposed behind the flange 102 to retain the holder 28 in its receiving station, may be lowered so as to enable the holder 28 to be moved forwardly from the tray or to be removed completely from the tray and for inspection or maintenance purposes. A forward position of the holder 28 is shown also in chain-dotted outline in FIG. 3.

What is claimed is:

1. An optical fiber tray having a front end region and a rear end region and comprising:
   a mounting region for optical connectors, the mounting region disposed at the front end region of the tray and comprising a plurality of connector mounting positions disposed in a series which extends from mounting position to mounting position laterally of the tray so that the connectors when mounted in the mounting positions each has an end facing forwardly and another end facing rearwardly of the connector;
   a first storage facility for optical fibers to be connected to rear facing ends of the connectors, the storage facility disposed rearwardly of the mounting position;
   a second storage facility with access to the second storage facility for other optical fibers to be connected to forward facing ends of the connectors, the second storage facility comprising a series of side-by-side dividers which are disposable into operating positions to separate the second storage facility into a series of storage regions between the dividers, the dividers being movable from the operating positions to provide access to any individual storage region; and
   a minimum bend radius limiting means for directing the other optical fibers from the second storage facility and outwardly from the tray, the minimum bend radius limiting means freely movable in a direction extending between the front and rear end regions of the tray.

2. A tray according to claim 1 wherein the dividers are separately hinged to the tray to permit hinging of a required number of dividers to provide access to any individual storage region.

3. A tray according to claim 2 wherein the dividers are pivotally hinged to the tray about parallel axes and the dividers are substantially planar and are normally disposed in operating positions in substantially parallel planes with the parallel axes relatively disposed along a line inclined to said parallel planes to permit the dividers in turn to be pivoted out of the operating positions free from interference with any divider previously moved from the operating position.

4. A tray according to claim 1 wherein the minimum bend radius limiting means is mounted upon a rearwardly extending slide which is slidably mounted upon the tray.

5. A tray according to claim 1 provided with an optical connector holder and an optical connector holder receptacle, the optical connector holder provided with the first storage facility and the mounting region, the optical connector holder mounted within the receptacle for movement forwardly from a holder receiving station in the receptacle to a position in which a front end region of the optical connector holder extends beyond the receptacle, and the second storage facility is disposed in the optical connector holder receptacle laterally of the optical connector holder.

6. A tray according to claim 5 wherein the optical connector holder has a connector guard movable between a connector guarding position extending in front of the mounting region and a position removed from the guarding position.

7. A tray according to claim 1 provided with an optical connector holder and an optical connector holder receptacle;
   the second storage facility disposed in the optical connector holder receptacle laterally between the optical connector holder and the minimum bend radius limiting means;
   the minimum bend radius limiting means movable between the front and rear end regions of the tray relative to the second storage facility; and
   the optical connector holder provided with the first storage facility and the mounting region with the optical connector holder mounted with the receptacle for movement, relative to the second storage facility, forwardly from a holder receiving station in the receptacle to a position in which a front end region of the optical connector holder extends beyond the receptacle.

8. An optical fiber shelf and tray assembly comprising a shelf having a front and a rear and a plurality of optical fiber trays movable individually through the front of the shelf into and out of storage positions within the shelf in which positions the trays are disposed in parallel series relationship, and each optical fiber tray has a front end region and a rear end region and comprises:
   a mounting region for optical connectors, the mounting region disposed at the front end region of the tray and comprising a plurality of connector mounting positions disposed in a series which extends from mounting position to mounting position laterally of the tray so that the connectors when mounted in the mounting positions each has an end facing forwardly and another end facing rearwardly of the connector;
   a first storage facility for optical fibers to be connected to rear facing ends of the connectors, the first storage facility mounted rearwardly of the mounting region;
   a second storage facility with access to the second storage facility for other optical fibers to be connected to forward facing ends of the connectors, the second storage facility comprising a series of side-by-side dividers which are disposable into operating positions to separate the second storage facility into a series of storage regions between the dividers, the dividers being movable from the operating positions to provide access to any individual storage region; and
   a minimum bend radius limiting means for directing the other optical fibers from the second storage facility and outwardly from the shelf, the minimum bend radius limiting means freely movable in a direction extending between the front and rear end regions of the tray.

9. An assembly according to claim 8 wherein in each tray the dividers are separately hinged to the tray to permit hinging of a required number of dividers to provide access to any individual storage region.

10. An assembly according to claim 9 wherein in each tray the dividers are pivotally hinged to the tray about parallel axes and the dividers are substantially planar and are normally disposed in operating positions in substantially parallel planes with the parallel axes relatively disposed along a line inclined to said parallel planes to permit the dividers in turn to be pivoted out of the operating positions free from interference with any divider previously moved from its operating position.

11. An assembly according to claim 8 wherein in each tray, the minimum bend radius limiting means is mounted upon a rearwardly extending slide which is slidable upon the tray, the minimum bend radius limiting means extending around a front edge of the shelf with the tray in its storage position.

12. An assembly according to claim 11 wherein each tray is fitted with said other optical fibers, the other optical fibers extending from connectors mounted in the mounting positions, through the second storage facility and around the minimum bend radius limiting means to pass outwardly of the shelf, the other fibers resisting forward movement of the minimum bend radius limiting means as the tray is moved forwardly from its storage position within the shelf until a rear part of the tray approaches and then engages the slide to move the slide and the minimum bend radius limiting means forward with the tray, and upon return movement of the tray to the storage position, the other optical fibers assist in moving the minimum bend radius limiting means rearwardly towards the front edge of the shelf.

13. An assembly according to claim 12 wherein each tray comprises an optical connector holder and an optical connector holder receptacle, the optical connector holder provided with the first storage facility and the mounting region, the optical connector holder mounted within the receptacle for movement forwardly from a holder receiving station in the receptacle to a position in which a front end region of the optical connector holder extends beyond the receptacle, and the second storage facility is disposed in the optical connector holder receptacle laterally of the optical connector holder.

14. An assembly according to claim 13 wherein the optical connector holder of each tray has a connector guard movable between a connector guarding position extending in front of the mounting region and a position removed from the guarding position, the guard being retained in its guarding position when the tray is disposed within the storage position, and being movable from the guarding position only when the tray is moved forwardly from the storage position.

15. An assembly according to claim 8 wherein each tray is provided with an optical connector holder and an optical connector holder receptacle, and in each tray:

the second storage facility is disposed in the optical connector holder receptacle laterally between the optical connector holder and the minimum bend radius limiting means;

the minimum bend radium limiting means is movable between the front and rear end regions of the tray relative to the second storage facility;

and the optical connector holder is provided with the first storage facility and the mounting region with the optical connector holder mounted within the receptacle for movement, relative to the second storage facility, forwardly from a holder receiving station in the receptacle to a position in which a front end region of the optical connector holder extends beyond the receptacle.

* * * * *